United States Patent
Liu et al.

(10) Patent No.: US 11,044,056 B2
(45) Date of Patent: Jun. 22, 2021

(54) ENHANCED RESOURCE UNIT ALLOCATION SCHEMES FOR OFDMA TRANSMISSION IN WLAN

(71) Applicant: MediaTek Singapore Pte. Ltd., Solaris (SG)

(72) Inventors: Jianhan Liu, San Jose, CA (US); Shengquan Hu, San Jose, CA (US); Yongho Seok, San Jose, CA (US); Thomas Edward Pare, Jr., San Jose, CA (US); Yungping Hsu, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 18 days.

(21) Appl. No.: 16/255,623

(22) Filed: Jan. 23, 2019

(65) Prior Publication Data
US 2019/0238288 A1 Aug. 1, 2019

Related U.S. Application Data

(60) Provisional application No. 62/624,860, filed on Feb. 1, 2018.

(51) Int. Cl.
*H04L 5/00* (2006.01)
*H04W 72/04* (2009.01)
*H04L 1/00* (2006.01)
*H04W 84/12* (2009.01)

(52) U.S. Cl.
CPC .......... *H04L 5/0037* (2013.01); *H04L 1/0057* (2013.01); *H04L 1/0059* (2013.01); *H04L 5/003* (2013.01); *H04L 5/0007* (2013.01); *H04L 5/0091* (2013.01); *H04W 72/042* (2013.01); *H04W 72/044* (2013.01); *H04W 84/12* (2013.01)

(58) Field of Classification Search
None
See application file for complete search history.

(56) References Cited

U.S. PATENT DOCUMENTS

| 2013/0229996 | A1 | 9/2013 | Wang et al. | |
|---|---|---|---|---|
| 2016/0212246 | A1* | 7/2016 | Seok | H04L 69/22 |
| 2016/0315681 | A1* | 10/2016 | Moon | H04B 7/0452 |
| 2017/0041929 | A1 | 2/2017 | Noh et al. | |

(Continued)

FOREIGN PATENT DOCUMENTS

| CN | 105960807 A | 12/2013 |
|---|---|---|
| CN | 106576102 A | 4/2017 |

(Continued)

*Primary Examiner* — Christine T Duong

(57) ABSTRACT

Systems and methods of transmitting a PPDU to or from a single user station (STA) in an OFDMA transmission by using multiple RUs. An access point (AP) allocates multiple RUs to an STA for an OFDMA transmission and correspondingly specifies the STA ID repeatedly in the user specific field of a SIG-B field in a downlink PPDU, or in the user information fields of a trigger frame. Alternatively, multiple AIDs of the STA can be specified in the user specific field or the user information fields instead of repeating the same STA ID. An indication may be inserted in the SIG-A field to indicate that the enhanced RU allocation scheme is used for the OFDMA transmission.

22 Claims, 12 Drawing Sheets

(56) References Cited

U.S. PATENT DOCUMENTS

2018/0248591 A1* 8/2018 Geng .................... H04L 1/0006
2020/0274662 A1* 8/2020 Huang .................. H04L 5/0053

FOREIGN PATENT DOCUMENTS

| CN | 107113833 A | 8/2017 |
| CN | 107211452 A | 9/2017 |
| TW | 201711504 A | 3/2017 |
| WO | 2017/027573 A1 | 2/2017 |
| WO | 2017027573 A1 | 2/2017 |

* cited by examiner

400

```
┌─────────────────────────────────────────────────────────────┐
│ At an AP, allocating multiple RUs to an STA for an uplink   │─── 401
│ OFDMA transmission                                          │
└─────────────────────────────────────────────────────────────┘
                              │
                              ▼
┌─────────────────────────────────────────────────────────────┐
│ Generating an HE TB PPDU including a trigger frame operable │─── 402
│ to trigger the uplink OFDMA transmission from the STA       │
└─────────────────────────────────────────────────────────────┘
                              │
                              ▼
┌─────────────────────────────────────────────────────────────┐
│ Setting the common information field in the PPDU to         │─── 403
│ indicate the type of the trigger frame                      │
└─────────────────────────────────────────────────────────────┘
                              │
                              ▼
┌─────────────────────────────────────────────────────────────┐
│ Setting one or more user information fields in the HE SIG-B │─── 404
│ field of an HE TB PPDU, each user information field         │
│ including 1 or 2 RUs of the multiple RUs and a STA ID       │
└─────────────────────────────────────────────────────────────┘
                              │
                              ▼
┌─────────────────────────────────────────────────────────────┐
│ Performing encoding, constellation mapping and tone mapping │─── 405
│ on the PPDU                                                 │
└─────────────────────────────────────────────────────────────┘
                              │
                              ▼
┌─────────────────────────────────────────────────────────────┐
│ Transmitting the TB PPDU to trigger the STA to transmit a   │─── 406
│ PPDU in OFDMA by using the allocated multiple RUs           │
└─────────────────────────────────────────────────────────────┘
```

*FIG. 4*

ENHANCED RESOURCE UNIT ALLOCATION SCHEMES FOR OFDMA TRANSMISSION IN WLAN

CROSSREFERENCE TO RELATED APPLICATION

This patent application claims priority and benefit of the U.S. Provisional Patent Application No. 62/624,860, entitled "ENHANCED RESOURCE UNIT ALLOCATION SCHEMES FOR OFDMA TRANSMISSION IN WLAN," filed on Feb. 1, 2018, the entire content of which is herein incorporated by reference for all purposes.

TECHNICAL FIELD

Embodiments of the present disclosure relate generally to the field of network communication, and more specifically, to the field of communication protocols used in wireless communication.

BACKGROUND OF THE INVENTION

Wireless local area networks (WLANs) and mobile communication devices have become increasingly ubiquitous, such as smart phones, wearable devices, various sensors, Internet-of-Things (IoTs), etc. Orthogonal frequency-division multiple access (OFDMA) is a widely used digital modulation scheme that enables multi-user (MU) access by allocating resource units (RUs) to individual user stations. Each RU is composed of a prescribed number of frequency subcarriers or tones, e.g., 13 tones, 26 tones, 52 tones, or 106 tones, and etc.

According to the IEEE.11ax Standards and Specifications for high efficiency (HE)-WLAN, each user station in an OFDMA transmission is allocated with a single RU. This can impose a great constraint in the WLAN network performance and efficiency. For example, in order to use a 20 MHz channel for an OFDMA transmission to or from two user stations, each station can be allocated with a 106-tone RU to maximize the channel usage efficiency as allowed by the IEEE.11ax Standards. However, even with allocation of this largest RU, there are two 13-tone RUs in the center of the 20 MHz channel left unused, causing loss of more than 10% of the spectral efficiency. In some preamble puncture scenarios, to mitigate the interference to the punctured subbands, adjacent RUs may be nulled. Due to the HE WLAN RU allocation constraint, a large portion of the frequency channel is wasted and cannot be used.

This constraint can also undesirably reduce the frequency diversity during wideband transmissions. For example, given an 80 MHz channel, the channel response of an individual user station (the "first user station") typically exhibits good response characteristics in the non-contiguous ranges of [0:20] MHz and [60:80] MHz, but has poor characteristics in the center [20:60] MHz range. In the case of an OFDMA transmission that also involves another user station, the first user station can only be allocated with an RU in either the [0:20] MHz or the [60:80] MHz range because only one RU can be allocated. As a result, due to the constraint, frequency diversity cannot be fully exploited in such a transmission.

SUMMARY OF THE INVENTION

Accordingly, systems and methods disclosed herein provide effective and backwards-compatible communication protocols to enable flexible allocation of multiple frequency subchannels (or resource units (RUs)) to a single user for OFDMA transmissions in a wireless local area network (WLAN), thereby enhancing spectral usage efficiency and frequency diversity of the network.

Embodiments of the present disclosure include using an access point (AP) to allocate multiple RUs to a non-AP STA (or herein "STA" for brevity unless specified otherwise) for the STA to transmit or receive in an OFDMA transmission. The multiple RU allocation is communicated to the STA by identifying the STA in multiple user fields in a packet preamble, each corresponding to a respective RU. The RUs allocated the STA can be contiguous or non-contiguous. In some embodiments, the packet has a multi-user (MU) format in which a plurality of user fields are originally defined for RU allocation to multiple users, each user corresponding to a respective RU and identified by its STA ID in a user field. By reusing the user fields in the MU format to allocate multiple RUs to a single user station, the user STA receiving the packet can still recognize various packet fields correctly and decipher the RU allocation information based on the multiple user fields. This reused packet portion advantageously causes no incorrect operation or transmission interference by legacy receive STAs that do not support the reuse scheme, advantageously achieving backward compatibility with the legacy receive STAs.

In some embodiments, for a downlink OFDMA transmission, the AP generates a multi-user (MU) Physical Layer Convergence Protocol (PLCP) protocol data unit (PPDU) which specifies the multiple RUs allocated to an STA in the common field of the "SIG-B" field in the preamble. Correspondingly, the STA ID is repeated the same number of times in the multiple "STA-ID" fields of the "SIG-B" user field. Alternatively, multiple association IDs (AIDs) of the same STA can be respectively specified in the multiple "STA-ID" fields. An additional indication can be inserted to the "SIG-A" field to indicate that multiple RUs are assigned to the STA. The PPDU is then transmitted to the STA in OFDMA and by using the allocated multiple RUs. Upon receiving the PPDU, the STA resolves all the information that is transmitted in the multiple RUs associated with its STA ID or AIDs.

For an uplink OFDMA transmission, the AP transmits a trigger frame to initiate an STA to transmit a trigger-based PPDU in OFDMA to the AP. In the trigger frame, multiple RUs are specified in the user information field, and the same STA ID is repeated in the same number of times in the "STA-ID" field of the user information fields. Alternatively, multiple association IDs (AIDs) of the same STA can be specified in the "STA-ID" fields. Upon receiving the trigger frame, the STA identifies the multiple RUs associated with its STA ID or AIDs and transmits a PPDU to the AP in OFDMA by using the multiple RUs.

According to embodiments of the present disclosure, the user fields designed for identifying multiple users are reused for identifying a single STA and thereby associate the STA with the allocated multiple RUs. This advantageously enables multiple-RU allocation to a single STA without requiring a new packet format or any complicated modifications in the current AP and STA products. Hence multiple-RU allocation to a single STA can be achieved in a backward compatible manner.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

FIG. 1B illustrates format of the "HE-SIG-B" field 140 in the exemplary PPDU 100 in which an STA ID is repeated in the user specific fields in correspondence to the multiple RUs allocated to one STA according to an embodiment of the present disclosure.

FIG. 1C illustrates the format of the "HE-SIG-B" field in the exemplary PPDU in which different AIDs of an STA are assigned in the user fields in correspondence to the multiple RUs allocated to the STA according to another embodiment of the present disclosure.

FIG. 4 is a flow chart depicting an exemplary process of transmitting a trigger frame from an AP to an STA in order to trigger a UL OFDMA transmission from the STA by using multiple RUs in accordance with an embodiment of the present disclosure.

DETAILED DESCRIPTION

Figure 1A:
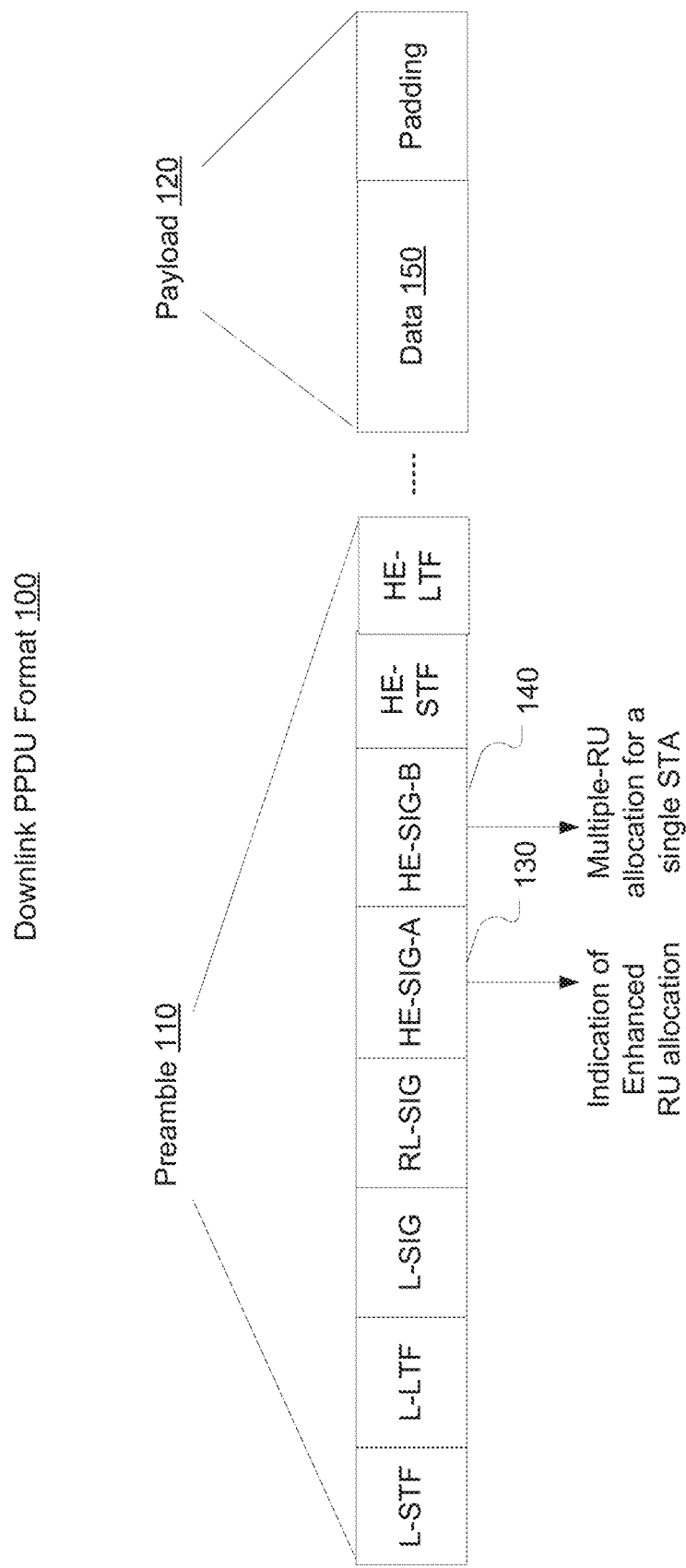
FIG. 1A illustrates the format of an exemplary downlink (DL) HE multi-user (MU) PPDU including indications of multiple-RU allocations to a single non-AP STA in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Enhanced Resource Unit Allocation Schemes for OFDMA Transmission in WLAN

Embodiments of the present disclosure are described in detail with reference to the Physical Layer Convergence Protocol (PLCP) protocol data unit (PPDU) structure as defined in the high efficiency (HE) WLAN based IEEE 802.11 family of Specifications and Standards. However, the present disclosure is not limited to any specific packet formats or structures, nor limited to any specific industry standards or specifications.

Embodiments of the present disclosure provide communication protocols for transmitting a PPDU to, or from, a single user station (STA) in an orthogonal frequency division multiplexing access (OFDMA) transmission by using multiple frequency subchannels, e.g., multiple resource units (RUs). Herein, the scheme of allocating multiple RUs to a single user STA may be referred to as enhanced RU allocation scheme. In some embodiments, an access point (AP) allocates multiple RUs to an STA for an OFDMA transmission and correspondingly specifies the STA ID repeatedly in the user specific field of a "SIG-B" field in a downlink PPDU, or in the user information field of a trigger frame. Alternatively, multiple AIDs of the STA can be specified in the user specific field or the user information field instead of repeating the same STA ID.

FIG. 1A illustrates the format of an exemplary downlink (DL) HE multi-user (MU) PPDU 100 including indications of multiple-RU allocations to a single non-AP STA in accordance with an embodiment of the present disclosure. The multiple RUs may be contiguous or non-contiguous RUs and may have varying sizes. The PPDU 100 includes a preamble 110 and a payload 120. The PPDU 100 is generated by an AP and carries data 150 encoded and modulated in multiple RUs and directed to a single STA. The preamble 110 includes the short and long training fields ("L-STF," "L-LTF," "HE-STF," and "HE-LTF") and the signaling fields ("L-SIG," "RL-SIG," "HE-SIG-A," "HE-SIG-B").

The "HE-SIG-B" field 140 as defined in the current IEEE 802.11 Specifications and Standards can provide DL MU RU allocation information to allow multiple receive STAs to look up the corresponding RUs in the data field of the packet. According to embodiments of the present disclosure, allocation of multiple RUs for a single STA is specified in the "HE-SIG-B" field 140 as described in greater detail with reference to FIGS. 1B and 1C.

An additional indication may be included in the "HE-SIG-A" field 130 to indicate the enhanced RU allocation scheme. For example, a reserved bit, e.g., B7, in "HE-SIG-A" is used. Based on this indication, the receive STA can determine whether to resolve only one user field or multiple fields in the "HE-SIG-B" as described in greater detail with reference to FIGS. 1B and 1C.

FIG. 1B illustrates format of the "HE-SIG-B" field 140 in the exemplary PPDU 100 in which an STA ID is repeated in the user specific fields in correspondence to the multiple RUs allocated to one STA according to an embodiment of the present disclosure. For example, the "HE-SIG-B" field 140 is separately encoded on each 20 MHz. The "RE-SIG-B" field 140 includes a "Common Field" 160 and a "User Specific Field" 170. The "Common Field" 160 carries the RU allocation subfield for indicating the RU assignments in the frequency domain. Depending on the total bandwidth allocated to the PPDU, the "Common Field" 160 can contain multiple RU allocation subfields.

The "User Specific Field" 170 includes zero or more "User Block Fields," e.g., field 171, 172 and 173 which may be followed by padding 174. Each "User Block Field" includes two user fields designed to contain information for up to two STAs to decode their payloads, a cyclic redundancy check (CRC) sequence and a trail. Each user field includes a "STA-ID" field, the value of which represents the identification of the one or two STAs. Each user field may further include fields for information related to the STAs, such as number of spatial streams (e.g., "NSTS"), use of transmit beamforming (e.g., "TX Beam-forming"), modulation and coding scheme (e.g., "MCS"), dual carrier modulation (e.g., "DCM") and coding mechanism (e.g., "Coding").

For an MU PPDU that allocates different RUs to multiple user STAs, the values in the "STA-ID" fields of the user fields represent the STA IDs, e.g., two STA IDs in one user block field. According to embodiments of the present disclosure, the ID of one STA (STA ID) is repeated multiple times in the one or more user fields in correspondence to the number of RUs allocated to the STA. Once the STA receives the PPDU and locates the STA IDs in the user fields, it can resolve all the information that is transmitted in the multiple allocated RUs. For any other STAs that receive the PPDU, including legacy STAs, this part of the information is ignored and would not cause unwanted operations. That is, one STA can be allocated with multiple RUs for one OFDMA transmission in a backward compatible manner.

In some other embodiments, multiple STA IDs or associate station IDs (AIDs) are assigned to one STA, which can be specified in the one or more user fields in correspondence to the number of RUs allocated to the STA. FIG. 1C illustrates the format of the "HE-SIG-B" field 140 in the exemplary PPDU 100 in which different AIDs of an STA are assigned in the user fields in correspondence to the multiple RUs allocated to the STA according to another embodiment of the present disclosure. Once the STA receives the PPDU and locate the AIDs, the STA can resolve all the information that is the transmitted in the RUs and associated with its STA AIDs in the PPDU. Similarly, for any other STAs that receive the PPDU, including legacy STAs, this part of the information is ignored and would not cause unwanted operations.

In some embodiments, the AIDs are assigned in the "HE-SIG-B" field 140 in a particular order such that, when the STA locates one AID in the PPDU, it knows whether to wait to resolve for another RU allocation with its next AID.

It will be appreciated that, the downlink PPDU may be an MU PPDU and directed to multiple user STAs and therefore also include RU allocation or spatial stream allocation information related to one or more other STAs besides the STA allocated with multiple RUs as described in FIGS. 1A-1C. For example, the one or more other STAs may be allocated with a single RU or multiple RUs.

Figure 2:
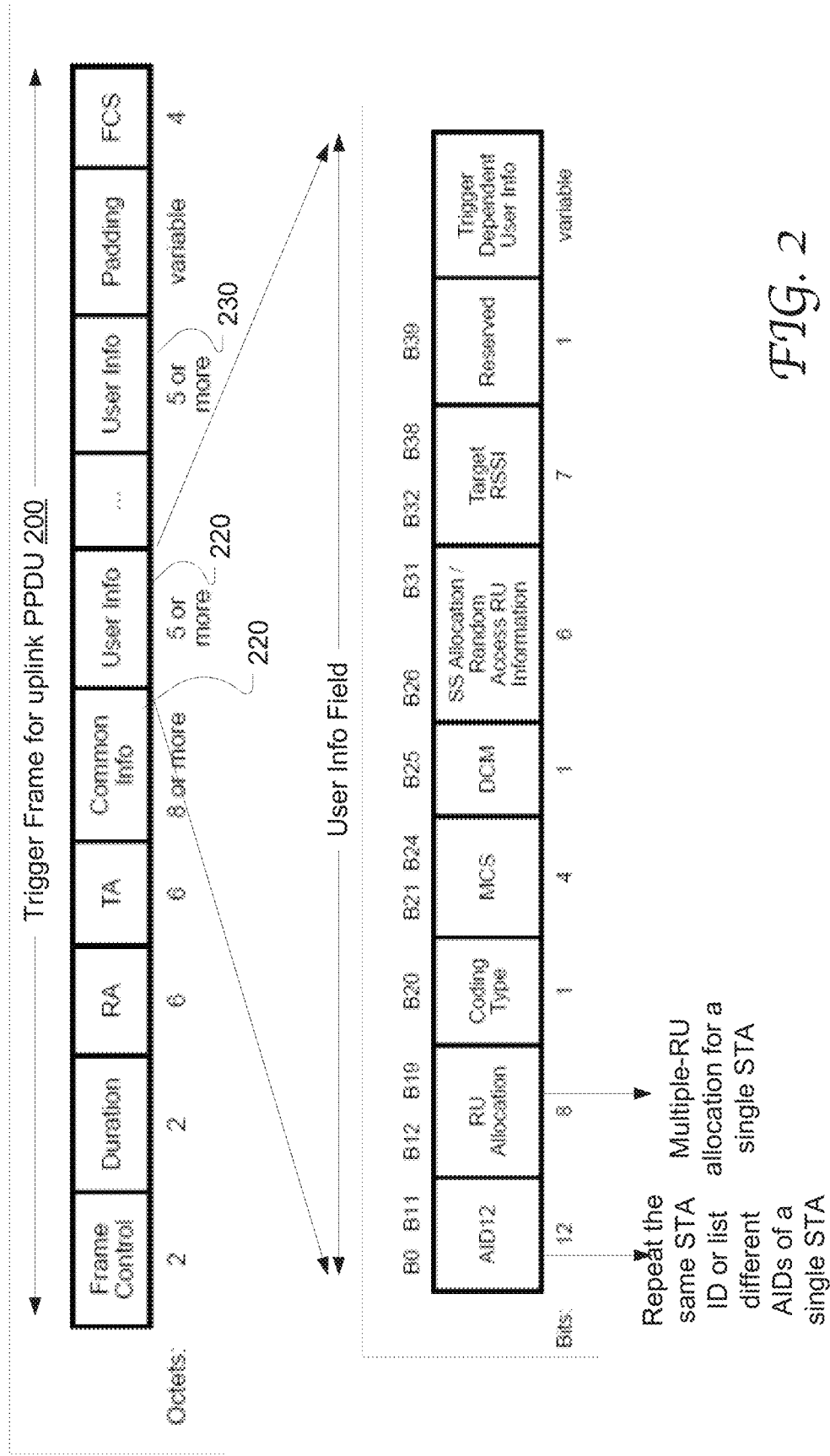
FIG. 2 illustrates the format of an exemplary uplink (UL) trigger frame used to trigger an OFDMA transmission from an STA by using multiple RUs in accordance with an embodiment of the present disclosure.

To initiate an uplink OFDMA transmission in a WLAN, an AP may first send a trigger frame to an STA enclosing the RU allocation information. According to the RU allocation signaling in the trigger frame, the STA transmits a PPDU to the AP in an OFDMA transmission and by using allocated multiple RUs. The allocated RUs may be contiguous or non-contiguous RUs and may have varying sizes. The trigger frame may itself be included in a PPDU transmitted from the AP. FIG. 2 illustrates the format of an exemplary uplink (UL) trigger frame 200 used to trigger an OFDMA transmission from an STA by using multiple RUs in accordance with an embodiment of the present disclosure.

The trigger frame 200 includes a frame control field (e.g., "Frame Control"), a transmission duration field ("Duration"), receiver address and transport address fields ("RA" and "TA"), a common information field ("Common Info") and one or more user information field ("User info"), a padding ("Padding") and a frequency check sequence ("FCS"). The common field 210 has a subfield used to indicate the type of trigger frame. For a conventional MU transmission, each user information field 220 contains the IDs of the multiple STAs to be triggered (e.g., "AID12"), allocated RUs ("RU Allocation"), allocated spatial streams ("SS Allocation Random Access RU Information") as well as other information required for the uplink MU transmission, such as coding type, modulation and coding scheme ("MCS"), dual carrier modulation ("DCM"), target received signal strength indicator ("Target RSSI"), and trigger dependent user information.

According to embodiments of the present disclosure. The ID or IDs of a single STA can be specified in the user information fields in correspondence to the multiple RUs allocated to it. As shown, the "RU allocation" field 221 contains the information related to a number of RUs allocated to a single STA, and the "AID12" field 222 repeats the STA IDs in the same number of times. In some other embodiments, the "AID12" field 222 lists different AIDs of the same STA in correspondence to the multiple-RU allocation specified in the "RU allocation" field 221. The repeated STA ID or the list of AIDs in combination with the RU allocation information serve to signal the receive STA to generate a subsequent uplink PPDU (e.g., HE TB PPDU) and transmit the PPDU to the AP in OFDMA according to the allocated RUs.

It will be appreciated that, the trigger frame (e.g., in the form of an HE PPDU) may be directed to multiple user STAs and therefore also may include RU allocation or spatial stream allocation information related to one or more other STAs besides the STA allocated with multiple RUs described above. For example, the one or more other STAs may be allocated with a single RU or multiple RUs in another user information field 230.

Figure 3:
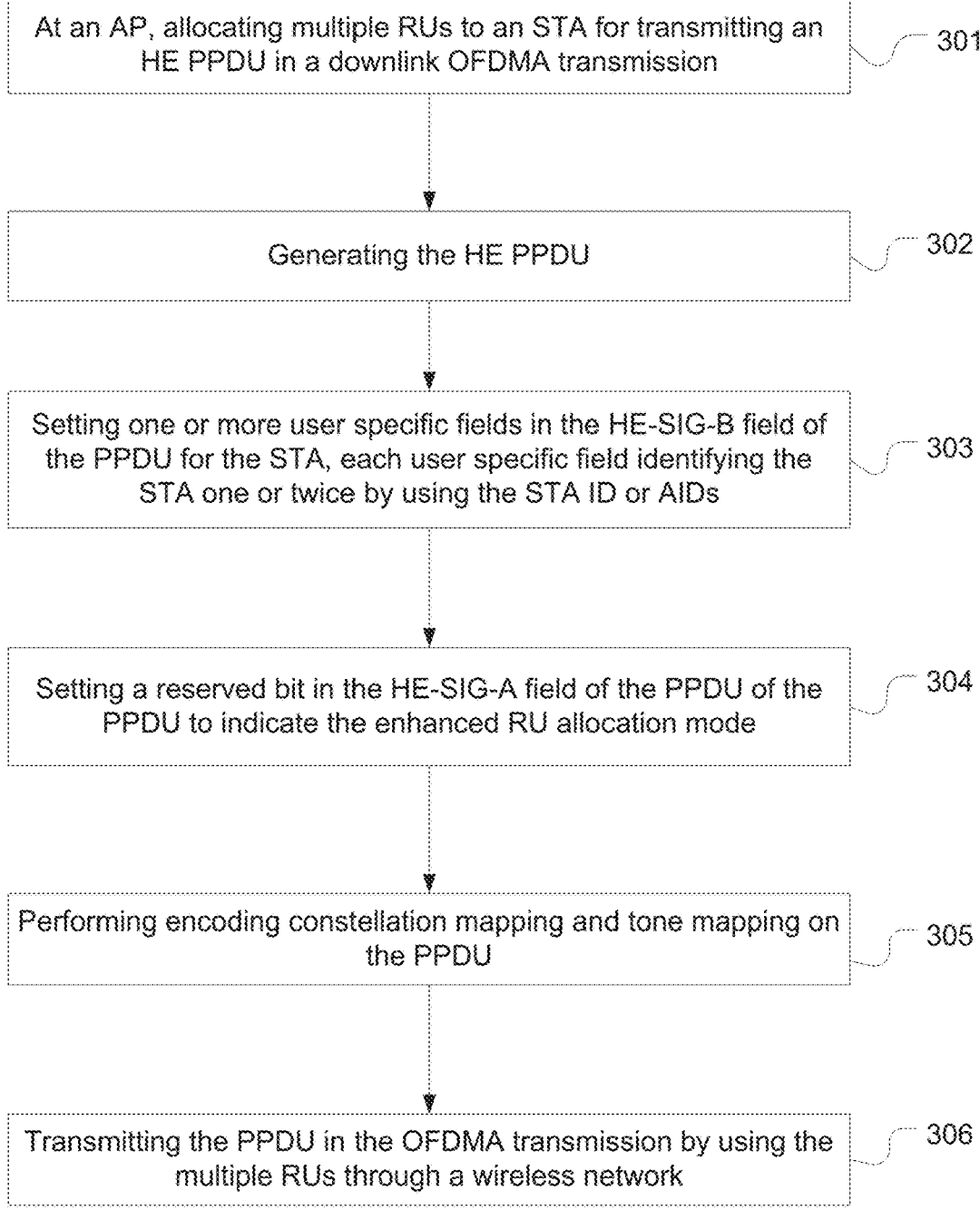
FIG. 3 is a flow chart depicting an exemplary process of allocating multiple RUs to an STA and transmitting a DL PPDU to the STA in OFDMA in accordance with an embodiment of the present disclosure.

FIG. 3 is a flow chart depicting an exemplary process 300 of allocating multiple RUs to an STA and transmitting a DL PPDU to the STA in OFDMA in accordance with an embodiment of the present disclosure. At 301, an AP allocates a plurality of RUs to an STA for transmitting an HE PPDU in a downlink OFDMA transmission. At 302, the AP generates the DL HE PPDU. At 303, in the PPDU preamble, one or more user block fields in user specific field of the HE-SIG-B field are set for the STA. Each user field in a block field identifies the STA once by using the same STA ID or a different AID. In some embodiments, in correspondence to the number of RUs allocated to the STA, an STA ID may be repeated the same number of times in the user specific field, as shown in FIG. 1B. In some other embodiments, different AIDs of the STA are assigned in the user specific field, each corresponding to an RU allocated to the STA.

At 304, a particular bit in the HE-SIG-A field of the PPDU preamble is set to indicate that one STA is assigned with multiple RUs, or the enhanced RU allocation mode. At 305, encoding, constellation mapping and tone mapping are performed on the PPDU according to the RU allocation. At 306, the PPDU is transmitted to the STA in a DL OFDMA transmission through a wireless network by using the allocated multiple RUs.

FIG. 4 is a flow chart depicting an exemplary process 400 of transmitting a trigger frame from an AP to an STA in order to trigger a UL OFDMA transmission from the STA by using multiple RUs in accordance with an embodiment of the present disclosure. At 401, the AP allocates a plurality of RUs to an STA for a UL OFDMA transmission. At 402, an HE PPDU is generated which includes a trigger frame operable to trigger the STA to transmit a PPDU to the AP in an OFDMA transmission. At 403, the common field in the trigger frame is set to indicate the type of the trigger fame. At 404, one or more user information fields in trigger frame are set, where each field includes one or two RUs of the multiple RUs allocated to the STA and an ID or a list of IDs of the STA. In some embodiments, in correspondence to the number of RUs allocated to the STA, the STA ID may be repeated the same number of times in the user information fields, as shown in FIG. 2. In some other embodiments, different AIDs of the STA are set in the user information fields, each AID corresponding to an RU allocated to the STA.

At 405, encoding, constellation mapping and tone mapping are performed on the trigger frame PPDU. At 306, the PPDU is transmitted to the STA in DL OFDMA through a wireless network by using the allocated multiple RUs. At 406, the trigger frame PPDU is transmitted from the AP to the STA. In response, the STA transmits an uplink PPDU (e.g., HE TB PPDU) in OFDMA to the AP by using the allocated multiple RUs as specified in the trigger frame.

Each of the transmitters illustrated in FIGS. 5-10 may be included in an AP and operable to transmit a DL PPDU in OFDMA to an STA in the enhanced RU allocation scheme. Alternatively, each of the transmitters illustrated in FIGS. 5-10 may be included in an STA operable to transmit a UL PPDU in OFDMA to an AP in the enhanced RU allocation scheme and in response to a trigger frame which specifies the RU allocation.

Figure 5:
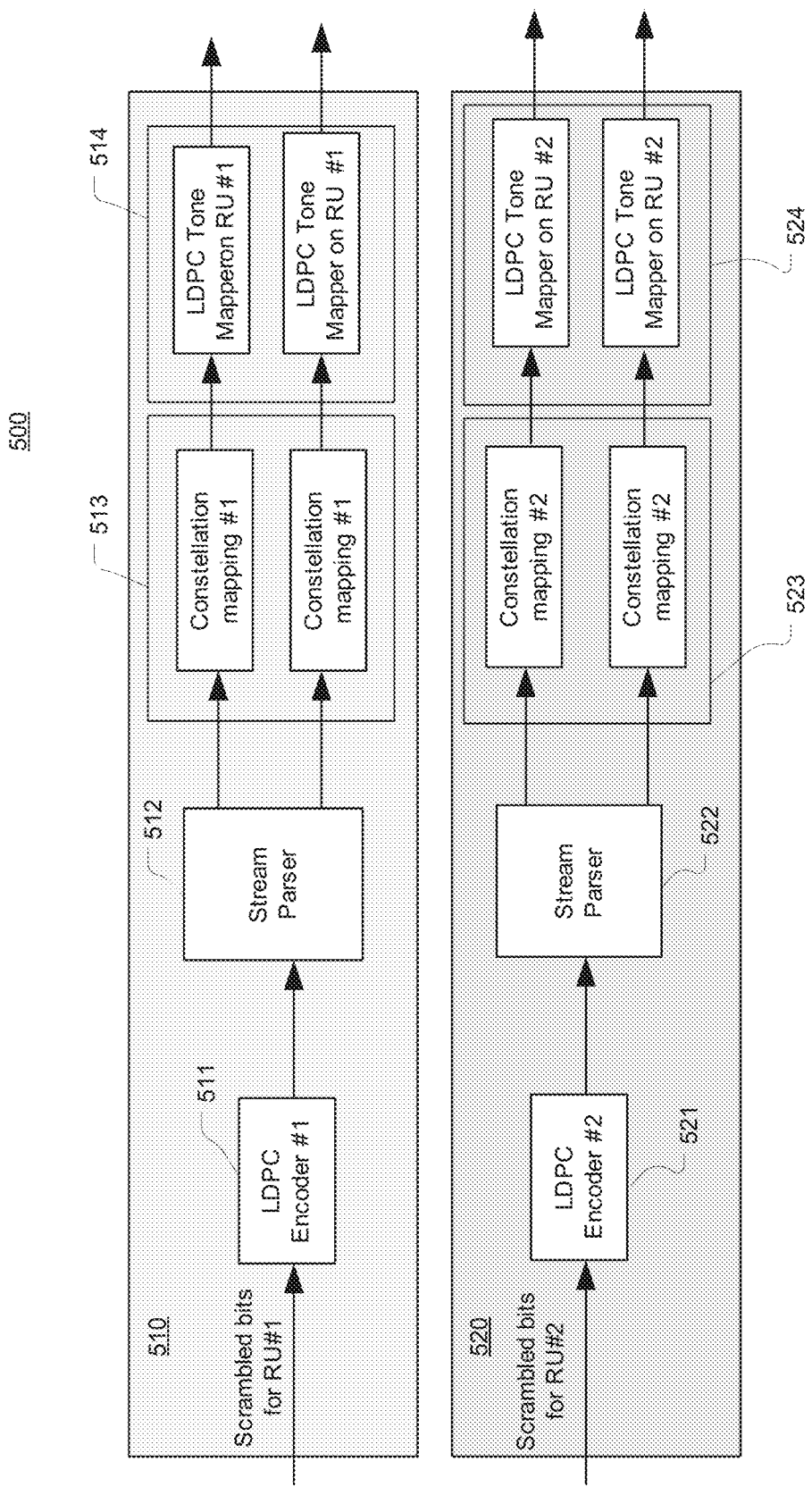
FIG. 5 illustrates the exemplary circuitry components and data flow in an exemplary transmitter configured for separate Low Density Parity Check (LDPC) encoding and separate tone mapping and used to enable enhanced RU allocation in an OFDMA transmission in accordance with an embodiment of the present disclosure.

In some embodiments, information associated with each RU is encoded separately. FIG. 5 illustrates the exemplary circuitry components and data flow in an exemplary transmitter 500 configured for separate Low Density Parity Check (LDPC) encoding and separate tone mapping and used to enable enhanced RU allocation in an OFDMA transmission in accordance with an embodiment of the present disclosure. In this example, two RUs are allocated to an STA for the OFDMA transmission, RU#1 and RU#2. The paths 510 and 520 are configured to generate information to be carried in RU#1 and RU#2, respectively. In this embodiment, information to be carried by the two RUs is encoded separately and independently. Constellation mapping and LDPC tone mapping are performed on each RU independently. In some embodiments, different coding rates and constellation schemes can be used for the different RUs.

For example, the path 510 is configured to process data associated with RU#1, and includes an LDPC encoder 511, a stream parser 512, a constellation mapper 513 and a LDPC tone mapper 514. The scrambled bits of the data associated with RU#1 are fed to the path 510. In parallel, the path 520 is configured to process data associated with RU#2, and includes an LDPC encoder 521, a stream parser 522, a constellation mapper 523 (assuming a two-point constellation scheme) and a LDPC tone mapper 524. The scrambled bits of the data associated with RU#2 are fed to the path 510.

Figure 6:
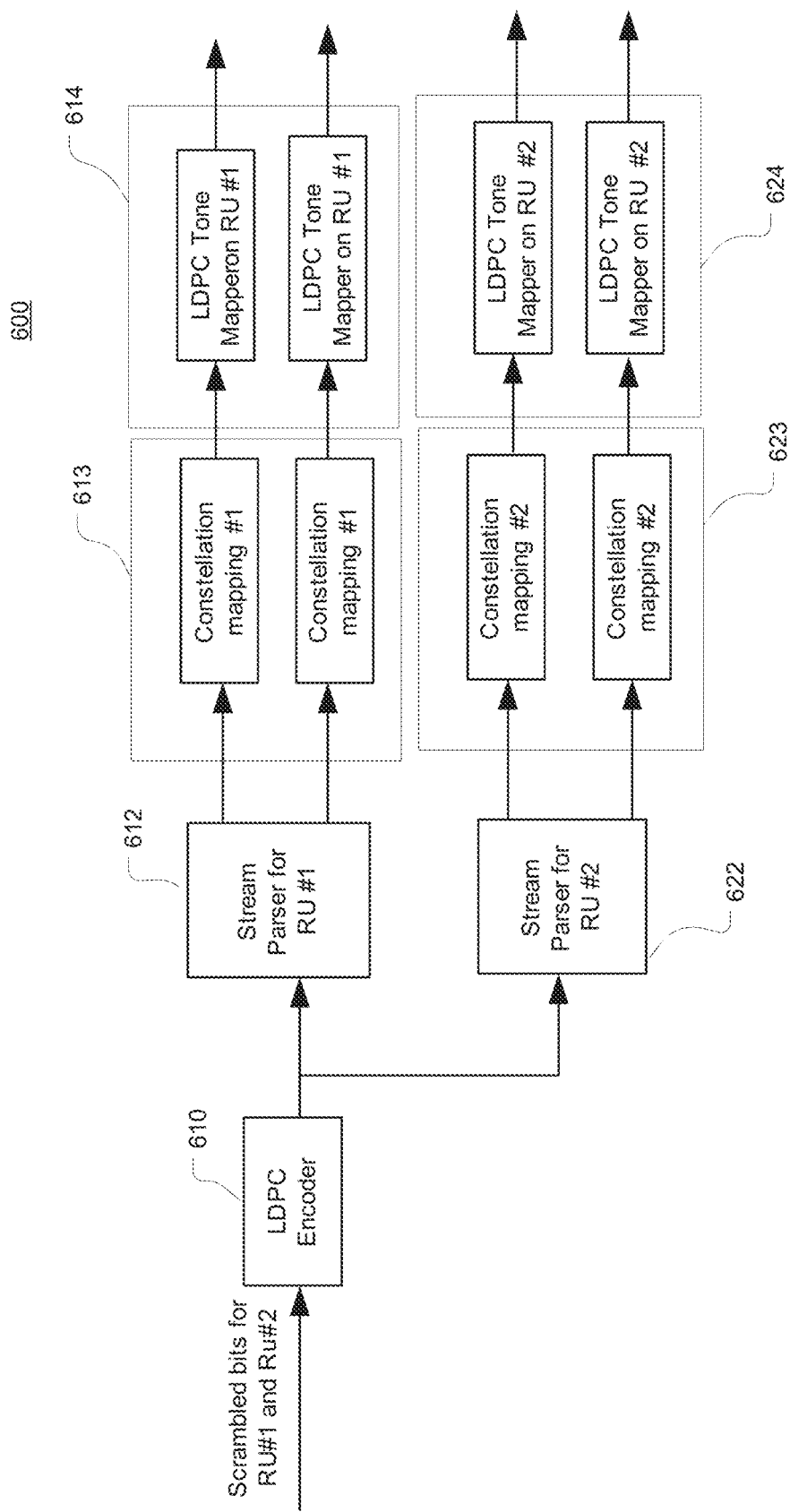
FIG. 6 illustrates the exemplary circuitry components and data flow in an exemplary transmitter configured for joint LDPC encoding and separate modulation with respect to the steams associated with different RUs allocated to an STA in accordance with an embodiment of the present disclosure.

In some other embodiments, all the RUs allocated to one STA is encoded using one encoder and in a single code rate. Constellation mapping and tone mapping can be performed with respect to each RU either independently or jointly depending on the embodiment. FIG. 6 illustrates the exemplary circuitry components and data flow in an exemplary transmitter 600 configured for joint LDPC encoding and separate modulation with respect to the steams associated with different RUs allocated to an STA in accordance with an embodiment of the present disclosure.

In this example, RU#1 and RU#2 are allocated to one STA for the OFDMA transmission and the scrambled bits associated therewith are jointly encoded in a single code rate and by using one encoder 610. Two stream parsers 612 and 622 are used to parse the streams associated with RU#1 and RU#2 respectively. Similarly, two constellation mappers 613 and 623 and two tone mappers 614 and 624 are used to operate on the streams associated with RU#1 and RU#2 respectively.

Figure 7:
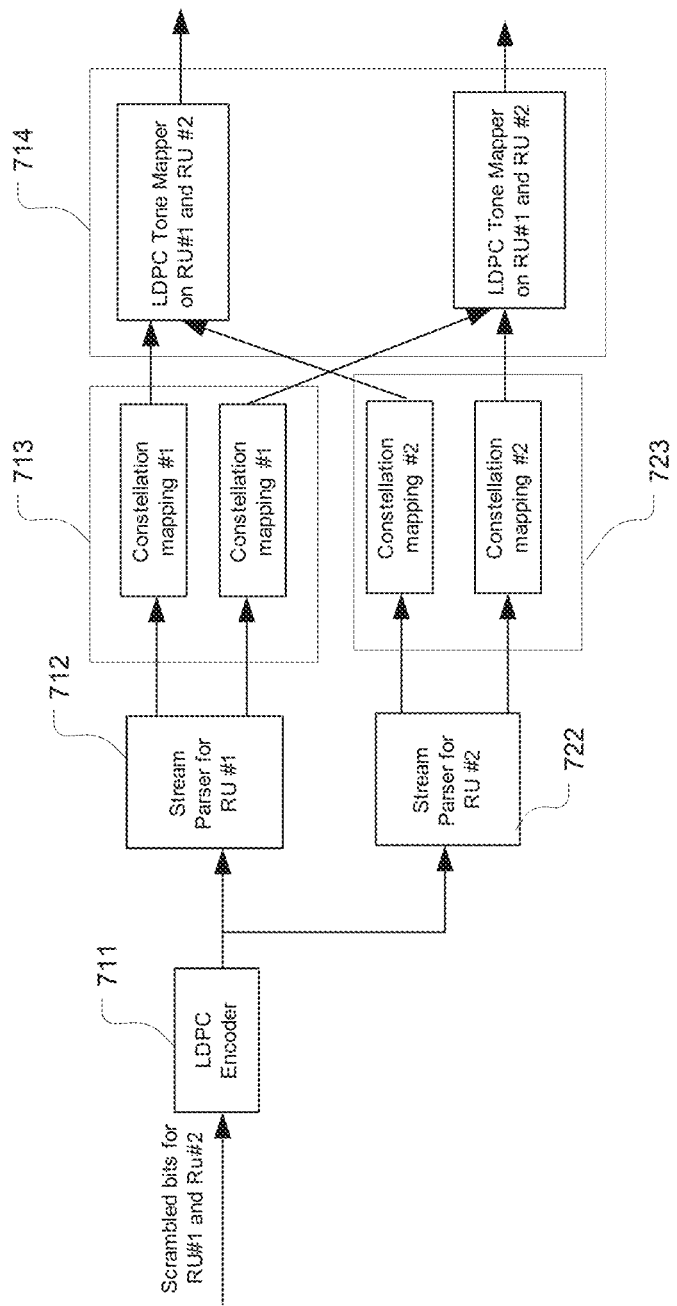
FIG. 7 illustrates the exemplary circuitry components and data flow in an exemplary transmitter configured for joint LDPC encoding and joint tone mapping with respect to the steams associated with different RUs allocated to an STA in accordance with an embodiment of the present disclosure.

In some embodiments, a joint encoder can be associated with a single LDPC tone mapper that maps the modulated tones across all the RUs allocated to the STA. FIG. 7 illustrates the exemplary circuitry components and data flow in an exemplary transmitter 700 configured for joint LDPC encoding and joint tone mapping with respect to the steams associated with different RUs allocated to an STA in accordance with an embodiment of the present disclosure. In this embodiment, a joint encoder 710 is used to encode the scrambled bits associated with both RUs allocated to the STA. Two stream parsers 711 and 722 are used to parse the streams associated with RU#1 and RU#2 respectively. A single LDPC tone mapper 714 is used to map the modulated tones (output from the constellation mappers 713 and 723) associated with both RU#1 and RU#2 by interleaving.

Figure 8:
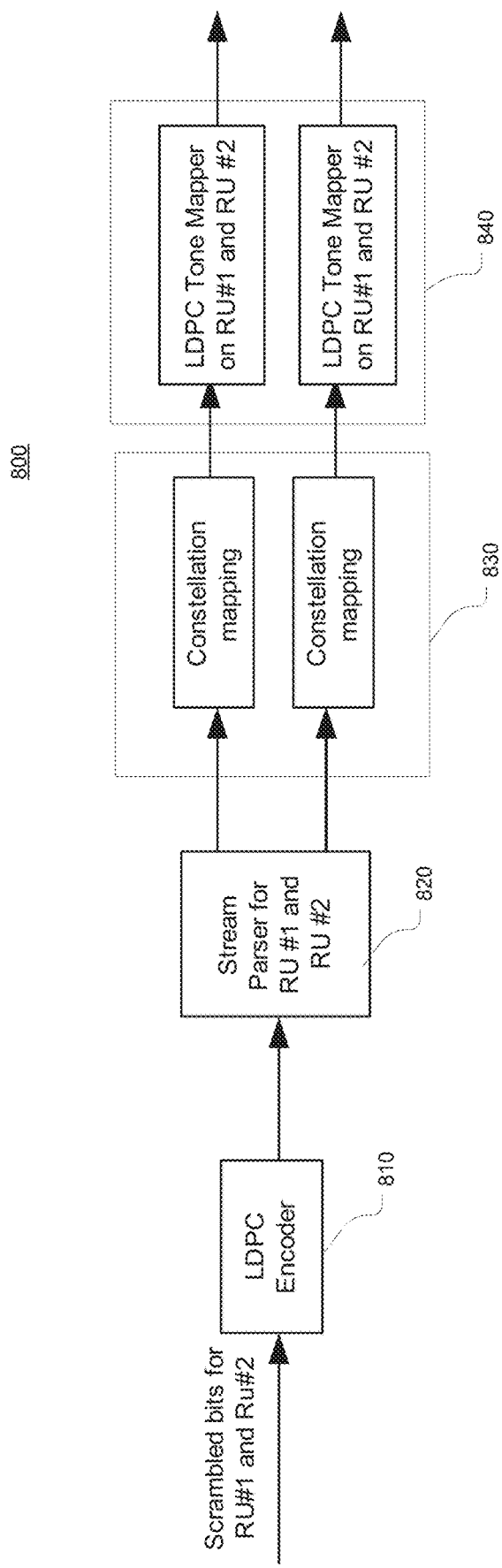
FIG. 8 illustrates the exemplary circuitry components and data flow in an exemplary transmitter configured for joint LDPC encoding, joint stream parsing and joint tone mapping with respect to the steams associated with different RUs allocated to an STA in accordance with an embodiment of the present disclosure.

In some embodiments, a joint encoder can be associated with a single stream parser and a single LDPC tone mapper that maps the modulated tones across all the RUs allocated to the STA. FIG. 8 illustrates the exemplary circuitry components and data flow in an exemplary transmitter 800 configured for joint LDPC encoding, joint stream parsing and joint tone mapping with respect to the steams associated with different RUs allocated to an STA in accordance with an embodiment of the present disclosure. In this embodiment, a single joint encoder 810 is used to encode the scrambled bits associated with both RUs allocated to the STA. A single stream parser 820 is used to parse the streams associated with RU#1 and RU#2. A single LDPC tone mapper 840 is used to map the modulated tones (output from the constellation mapper 830) associated with both RU#1 and RU#2 by interleaving. In this configuration, the streams of both RUs have the same special streams and the same constellation mapping.

Figure 9:
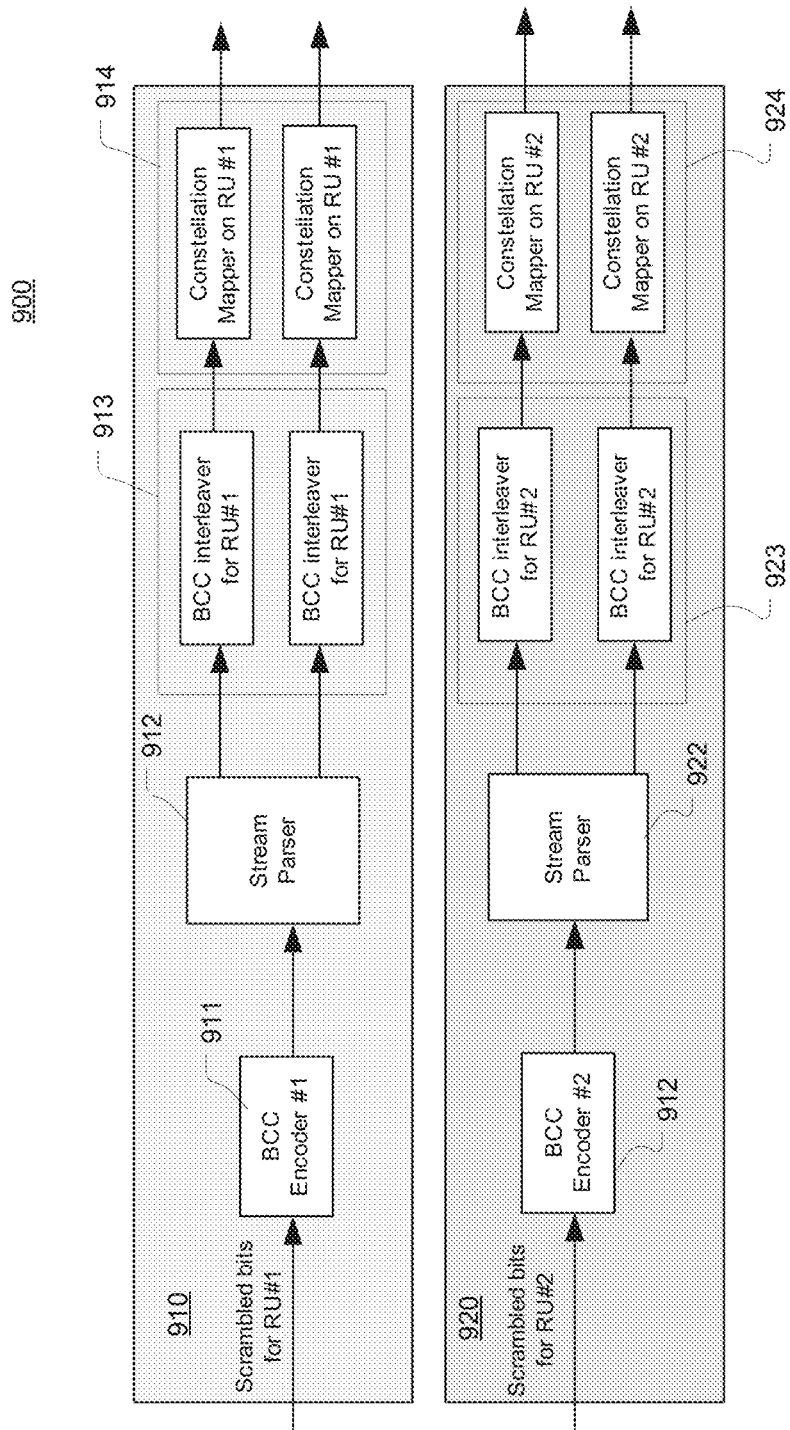
FIG. 9 illustrates the exemplary circuitry components and data flow in an exemplary transmitter configured for separate Binary Convolutional Codes (BCC) encoding and separate constellation mapping and used to enable enhanced RU allocation in an OFDMA transmission in accordance with an embodiment of the present disclosure.

FIG. 9 illustrates the exemplary circuitry components and data flow in an exemplary transmitter 900 configured for separate Binary Convolutional Codes (BCC) encoding and separate constellation mapping and used to enable enhanced RU allocation in an OFDMA transmission in accordance with an embodiment of the present disclosure. In this example, two RUs are allocated to an STA for the OFDMA transmission, RU#1 and RU#2, and information associated with each RU is encoded in BCC separately. The paths 910 and 920 are configured to generate information carried in RU#1 and RU#2, respectively. In this embodiment, information to be carried by the two RUs is encoded in BCC separately and independently. Streaming parsing, BCC interleaving and constellation mapping are also performed with respect to each RU independently. In some embodiments, different coding rates and constellation schemes can be used for the different RUs.

For example, the path 910 is configured to process the scrambled bits associated with RU#1, and includes a BCC encoder 911, a stream parser 912, a BCC interleaver 913, a constellation mapper 914. In parallel, the path 920 is configured to process the scrambled bits associated with RU#2, and includes a BCC encoder 921, a stream parser 922, a BCC interleaver 923, a constellation mapper 924.

In some embodiments, a joint BCC encoder can be associated with a single stream parser and a single BCC interleaver and a single constellation mapper. If all the RUs allocated to a single STA are encoded jointly, the BCC interleaver is configured based on the total coded bits contained in all the allocated RUs.

Figure 10:
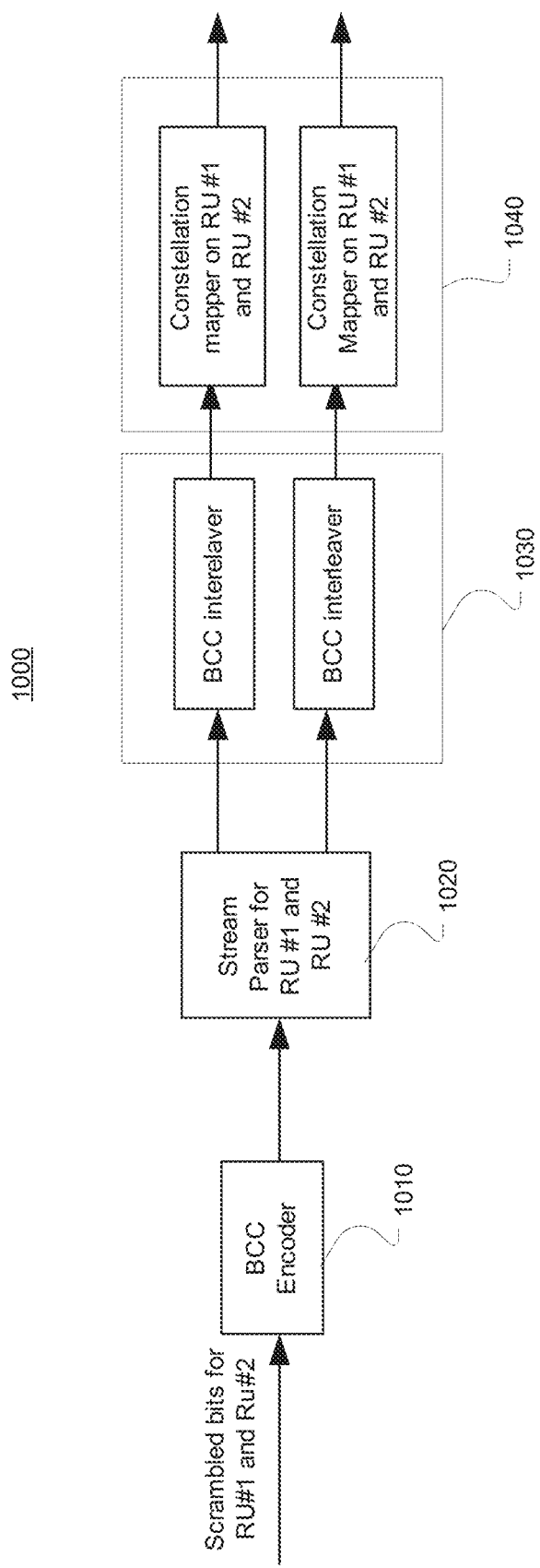
FIG. 10 illustrates the exemplary circuitry components and data flow in an exemplary transmitter configured for joint BCC encoding, joint BCC interleaving and joint constellation mapping with respect to the steams associated with different RUs allocated to an STA in accordance with an embodiment of the present disclosure.

FIG. 10 illustrates the exemplary circuitry components and data flow in an exemplary transmitter 800 configured for joint BCC encoding, joint BCC interleaving and joint constellation mapping with respect to the steams associated with different RUs allocated to an STA in accordance with an embodiment of the present disclosure. In this embodiment, a single joint BCC encoder 1010 is used to encode the scrambled bits associated with both RUs allocated to the STA. A stream parser 1020 is used to parse the streams associated with RU#1 and RU#2. A BCC interleaver 1030 interleaves the streams associated with RU#1 and RU#2 jointly. A constellation mapper 1040 is used to map the interleaved tones associated with both RU#1 and RU#2 by interleaving.

Figure 11:
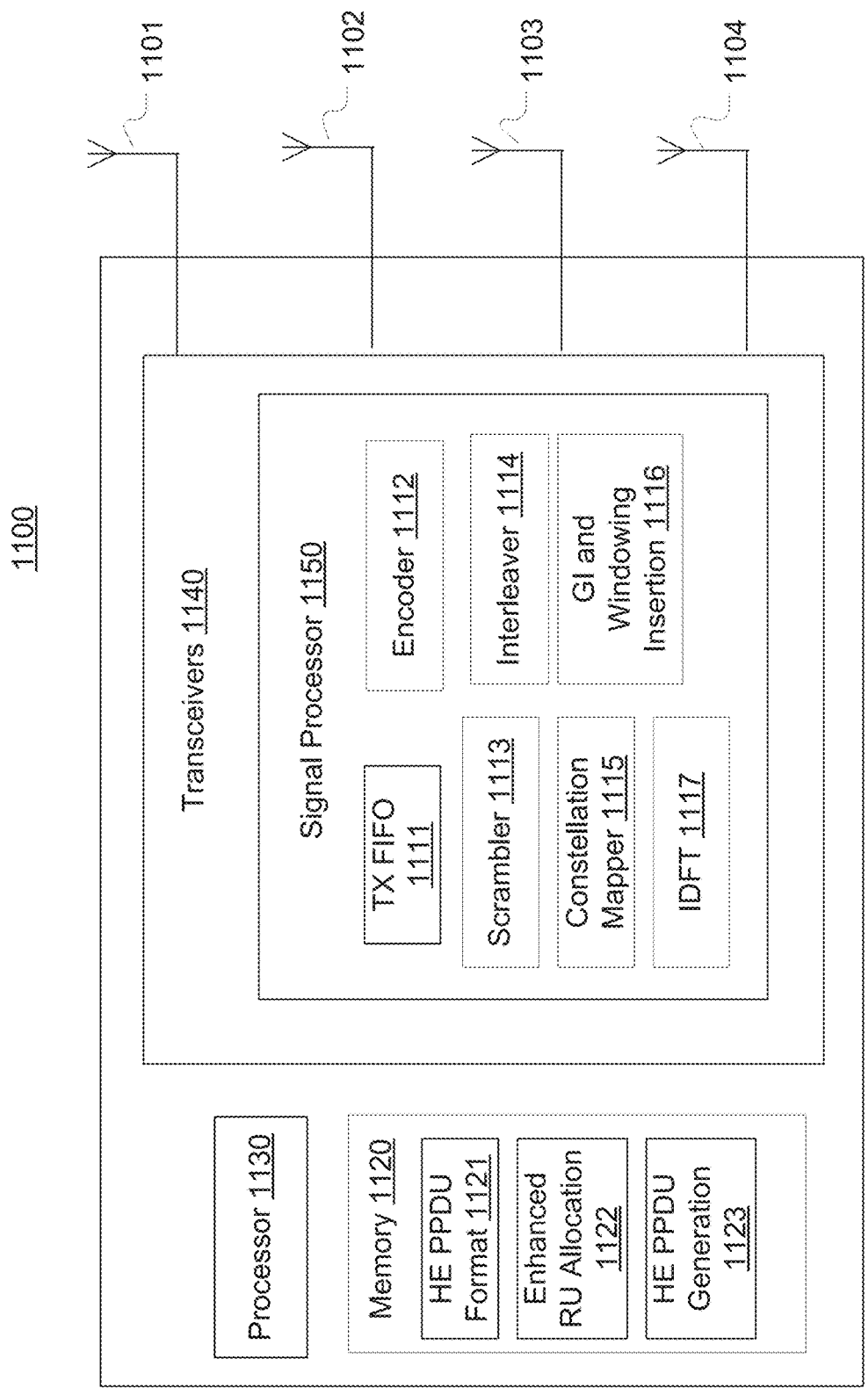
FIG. 11 is a block diagram illustrating an exemplary wireless communication device capable of generating and transmitting an HE PPDU to an STA by using multiple RUs in an OFDMA in accordance with an embodiment of the present disclosure.

FIG. 11 is a block diagram illustrating an exemplary wireless communication device 1100 capable of generating and transmitting an HE PPDU to an STA by using multiple RUs in an OFDMA in accordance with an embodiment of the present disclosure. The communication device 1100 may be an AP or an STA device having a transceiver configured for data communication, e.g., a general purpose computer, a smart phone, a portable electronic device, a tablet wearable device, a sensor used on Internet of Things (IoT), and etc.

The device 1100 includes a main processor 1130, a memory 1120 and a transceiver 1140 coupled to an array of antenna 1101-1104. The memory 1120 stores the HE PPDU formats including the format of signaling the enhanced RU allocation to a single STA as described in detail with reference to FIGS. 1A-2. The memory also stores processor-executable instructions that implement an enhanced RU allocation module 1122 and HE PPDU generation module 1123. The enhanced RU allocation module 1122 may use any suitable RU allocation algorithms, methods or policies to allocate multiple RUs to an STA without departing from the scope of the present disclosure. The HE PPDU generation module 1123 can generate signaling and indications related to the enhanced RU allocation in the HE-SIG-B and HE-SIG-A fields as described with reference to FIGS. 1A-4, as well as other sections of the PPDU.

The transceiver 1140 includes a signal processor 1150 having various modules of the transmit path which is configured to generate each section of a PPDU or any other type of communication transmission unit. For instance, the signal processor 1150 includes a transmit First-In-First-Out (TX FIFO) 1111, an encoder 1112, a scrambler 1113, an interleaver 1114, a constellation mapper 1115, an inversed discrete Fourier transformer (IDFT) 1117, and a guard interval (GI) and windowing insertion module 1116.

It will be appreciated that the transceiver 1140 in FIG. 11 may include a wide range of other suitable components that are well known in the art. The various components can be implemented in any suitable manner that is well known in the art and can be implemented using hardware, firmware and software logic or any combination thereof. Further, in some embodiments, the transceiver 1140 in FIG. 11 may as well include the components in a receiving path.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising:

at a transmit station, allocating multiple resource units (RUs) to a receive station for an Orthogonal frequency-division multiple access (OFDMA) transmission;

setting a first field of a preamble of a Physical Layer Convergence Protocol (PLCP) protocol data unit (PPDU) to specify the multiple RUs allocated to the receive station;

setting multiple user fields in said preamble of said PPDU, wherein each of said multiple user fields comprises an STA identification (ID) of said receive station in correspondence to a respective RU of said multiple RUs, and wherein each of said multiple user fields comprise a same station ID of said receive station; and transmitting said PPDU to said receive station.

2. The method of claim 1, further comprising setting a SIG-A field in said preamble to indicate that said PPDU specifies multiple RUs allocated to said receive device for said OFDMA transmission.

3. The method of claim 1, wherein each of said multiple user fields comprises a different association station ID of said receive station.

4. The method of claim 1, wherein said transmit station is an access point (AP) station and said receive station is a non-AP station, wherein said OFDMA transmission is a downlink data transmission of said PPDU, and wherein said multiple user fields are contained in one of more user block fields of a SIG-B field in said preamble and wherein said first field is a common field of said SIG-B field.

5. The method of claim 1, wherein said transmit station is an access point (AP) station and said receive station is a non-AP station, and wherein said OFDMA transmission is an uplink data transmission, wherein further said PPDU comprises a trigger frame operable to trigger said receive station to transmit data by using said multiple RUs in said OFDMA transmission to said AP station.

6. The method of claim 5, wherein said multiple user fields are contained in multiple user information fields in said trigger frame and wherein said multiple user information fields comprise said first field.

7. The method of claim 1 further comprising:
encoding data associated with each RU of said multiple RUs separately by using separate Low Density Parity Check (LDPC) encoders;
performing LDPC tone mapping on said data associated with each RU of said multiple RUs independently; and
transmitting said data in said OFDMA transmission.

8. The method of claim 1 further comprising:
encoding data associated with said multiple RUs jointly by using a same Low Density Parity Check (LDPC) encoder;
performing LDPC tone mapping on said data associated with said multiple RUs independently; and
transmitting said data in said OFDMA transmission.

9. The method of claim 1 further comprising:
encoding data associated with said multiple RUs jointly by using a same Low Density Parity Check (LDPC) encoder;
performing LDPC tone mapping on said data associated with each RU of said multiple RUs jointly; and
transmitting said data in said OFDMA transmission.

10. The method of claim 1 further comprising:
encoding data associated with said multiple RUs jointly by using a same Binary Convolution Codes (BCC) encoder;
performing BCC interleaving on said data associated with each RU of said multiple RUs separately; and
transmitting said data in said OFDMA transmission.

11. The method of claim 1 further comprising:
encoding data associated with said multiple RUs separately by separate Binary Convolution Codes (BCC) encoders;
performing BCC interleaving on said data associated with each RU of said multiple RUs jointly; and
transmitting said data in said OFDMA transmission.

12. A wireless communication device comprising:
a memory;
a processor coupled to the memory, wherein said memory comprises instructions that, when executed, cause said wireless communication device to allocate multiple resource units (RUs) to a receive station for an Orthogonal frequency-division multiple access (OFDMA) transmission; and
a transceiver coupled to said memory, wherein said transceiver is configured to:
generate a Physical Layer Convergence Protocol (PLCP) protocol data unit (PPDU) for transmission to said receive station, wherein generating the PPDU comprises:
setting a first field in a preamble of a Physical Layer Convergence Protocol (PLCP) protocol data unit (PPDU) to specify said multiple RUs allocated to said receive station; and
setting multiple user fields in a preamble of said PPDU, wherein each of said multiple user fields comprises: an STA identification (ID) of said receive station, wherein each of said multiple user fields comprise a same station ID of said receive station; and
transmit said PPDU to said receive station.

13. The wireless communication device of claim 12, further comprising setting a SIG-A field in said preamble to indicate that said PPDU specifies multiple RUs allocated to said receive device for said OFDMA transmission.

14. The wireless communication device of claim 12, wherein each of said multiple user fields comprises a different association station ID of said receive station.

15. The wireless communication device claim 12, wherein said transmit station is an access point (AP) station and said receive station is a non-AP station, wherein said OFDMA transmission is a downlink data transmission of said PPDU, wherein said multiple user fields are contained in one of more user block fields of a SIG-B field in said preamble of said PPDU and said first field is a common field of said SIG-B field.

16. The wireless communication device claim 12, wherein said transmit station is an access point (AP) station and said receive station is a non-AP station, and wherein said OFDMA transmission is an uplink data transmission from said non-AP station to said AP station that is initiated by a trigger frame transmitted from said AP station to said non-AP station, wherein said PPDU comprises said trigger frame.

17. The wireless communication device claim 16, wherein said multiple user fields are contained in multiple user information fields in said trigger frame and said multiple user information fields comprise said first field.

18. The wireless communication device of claim 12, wherein said transceiver is further configured to:
encode data associated with each RU of said multiple RUs separately by using separate Low Density Parity Check (LDPC) encoders;
perform LDPC tone mapping on said data associated with each RU of said multiple RUs independently; and
transmit said data in said OFDMA transmission.

19. The wireless communication device claim 12, wherein said transceiver is further configured to:
encode data associated with said multiple RUs jointly by using a same Low Density Parity Check (LDPC) encoder;
perform LDPC tone mapping on said data associated with said multiple RUs independently; and
transmit said data in said OFDMA transmission.

20. The wireless communication device claim 12, wherein said transceiver is further configured to:
encode data associated with said multiple RUs jointly by using a same Low Density Parity Check (LDPC) encoder;

perform LDPC tone mapping on said data associated with each RU of said multiple RUs jointly; and transmit said data in said OFDMA transmission.

21. The wireless communication device claim 12, wherein said transceiver is further configured to:

encode data associated with said multiple RUs jointly by using a same Binary Convolution Codes (BCC) encoder;

perform BCC interleaving on said data associated with each RU of said multiple RUs separately; and transmit said data in said OFDMA transmission.

22. The wireless communication device claim 12, wherein said transceiver is further configured to:

encode data associated with said multiple RUs separately by separate Binary Convolution Codes (BCC) encoders;

perform BCC interleaving on said data associated with each RU of said multiple RUs jointly; and transmit said data in said OFDMA transmission.

\* \* \* \* \*